Oct. 29, 1968    P. ENGELER    3,407,916
MACHINE FOR ARRANGING ARTICLES IN BATCHES
Filed Dec. 19, 1966    2 Sheets-Sheet 1

United States Patent Office 3,407,916
Patented Oct. 29, 1968

3,407,916
MACHINE FOR ARRANGING ARTICLES
IN BATCHES
Paul Engeler, Neuhausen am Rheinfall, Switzerland, assignor to Schweizerische Industrie-Gesellschaft, Neuhausen am Rheinfall, Switzerland
Filed Dec. 19, 1966, Ser. No. 602,873
Claims priority, application Switzerland, Dec. 24, 1965,
17,843/65
7 Claims. (Cl. 198—24)

ABSTRACT OF THE DISCLOSURE

A machine for arranging substantially rectangular cartons, in batches of, for example, 4×6=24 articles has a lower conveyor belt and an upper conveyor belt shorter than the lower belt. A brake plate follows the discharge end of the lower belt and a lifting plate follows the brake plate. When a batch of articles delivered between the belts is assembled on the lifting plate, the brake plate is actuated to withhold the delivery of further articles and the lifting plate is raised to the level of a table plate onto which the batch of articles is discharged. An auxiliary conveyor belt may be arranged above the discharge end of the lower belt and between the upper belt and a counter plate opposed to the brake plate.

Summary of the invention

The object of the present invention is to provide a batching machine which is more reliable and more compact than prior art batching machines in which the articles are delivered in one or a plurality of rows between opposed conveyor belts.

Thus the present invention provides a batching machine in which the upper conveyor belt is shorter than the lower conveyor belt so that the articles located on the delivery end of the upper run of the lower belt are free of the upper belt, and which further comprises a brake plate arranged beyond the delivery end of the lower belt for receiving the articles therefrom, an upwardly displaceable lifting plate following the brake plate for collecting a batch of conveyed articles thereon, a stop wall preventing said articles from being pushed beyond the lifting plate, and a pusher for pushing the batch of articles from the lifting plate after the latter has been displaced upwards.

Description of the preferred embodiment

Figure 1:
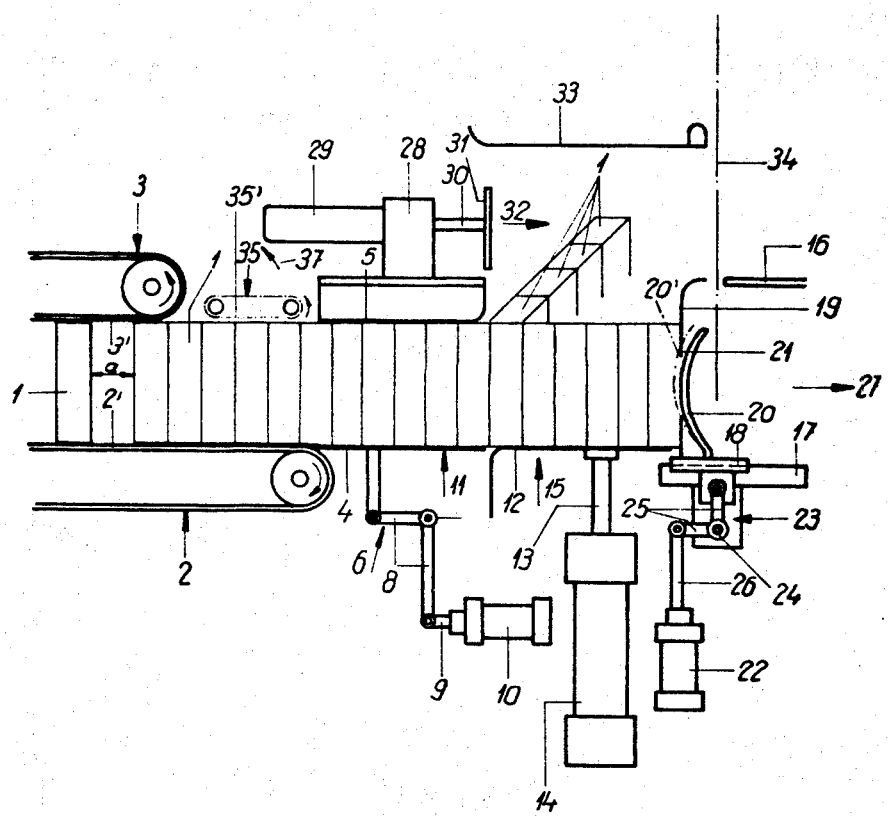
FIGURE 1 is a very diagrammatic side elevation showing the essential components of a preferred embodiment of batching machine for arranging cartons in batches of 6×4 for packaging.
Figure 2:
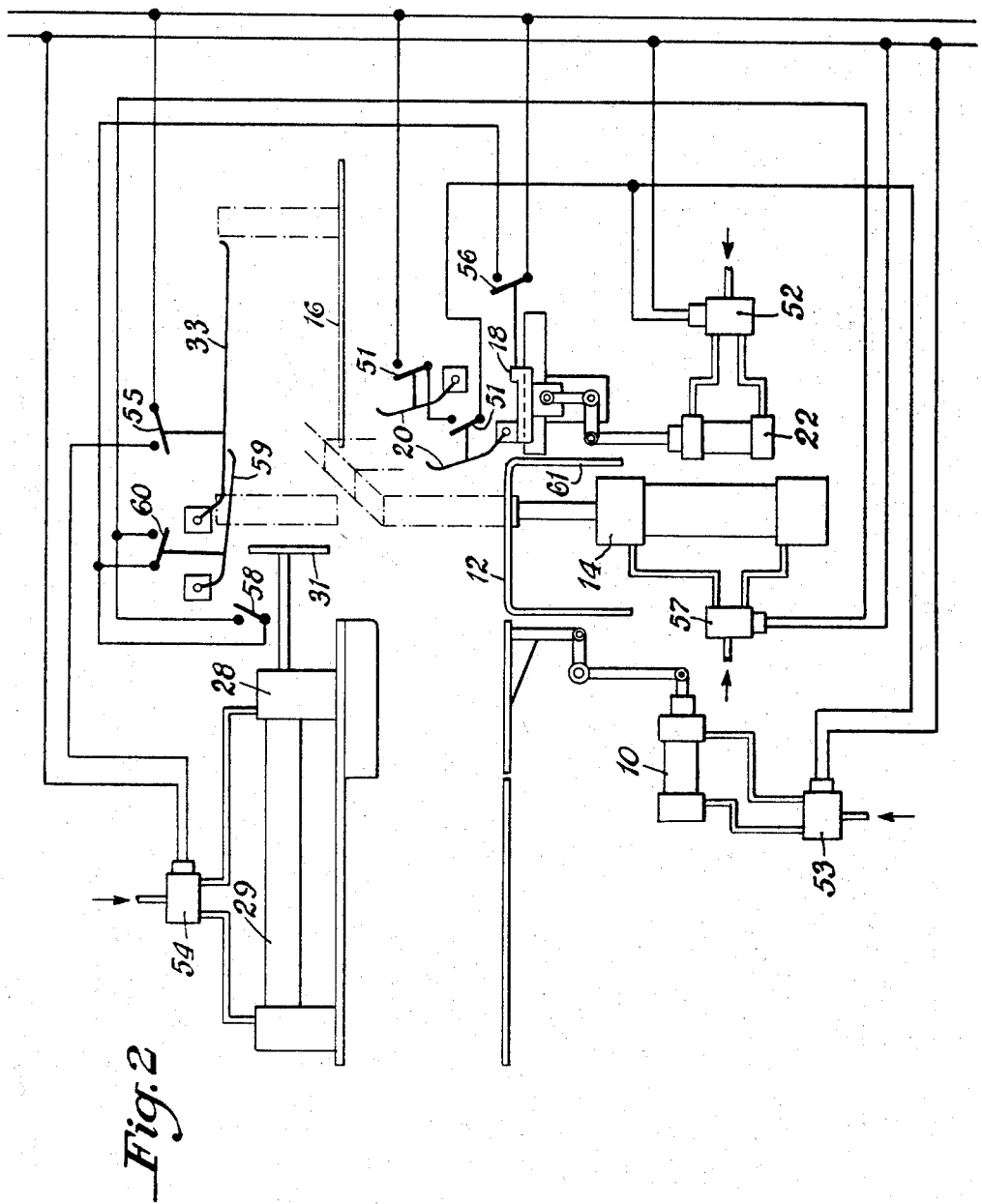
FIGURE 2 shows the control circuit and hydraulic system of the grouping machine.

The illustrated machine is intended for grouping rectangular cartons 1 in batches of 4×6=24 cartons for the purpose of packaging the individual batches. The machine has an endless conveyer belt 2 on which four side-by-side rows of cartons 1 are conveyed from a packing device (not illustrated) in which the cartons are filled and sealed. Above the endless belt 2 is located a second endless belt 3 whose lower run 3' is spaced from the upper run 2' of the lower belt 2 by a distance corresponding to the height of a carton, and which moves at the same speed as the lower belt. The upper belt 3 is somewhat shorter than the lower belt 2, so that the cartons 1 following each other between the belts 2 and 3 at short distances $a$ apart may be collected in face-to-face contact with each other on the free delivery end of the upper run 2' of the lower belt 2 offering resistance to their delivery from the belt 2. In any case, the upper belt 3 is always present when conventional filling and sealing devices are provided for the cartons if the latter are glued and to be held during conveying until the glued joints have set.

The upper run 2' of the lower belt 2 is followed at the same level by a movable brake plate 4 disposed opposite to a fixed counter plate 5 at a distance therefrom corresponding to the height of the cartons. A linkage 6, having a bell crank lever 8 pivotably mounted at 7, connects the brake plate 4 to a piston rod 9 of a piston displaceable in a pneumatic actuator cylinder 10, so that when the actuator cylinder 10 is charged with compressed air the brake plate 4 is urged in the direction of the arrow 11, i.e., upwardly towards the counter plate 5.

The brake plate 4 is followed at the same level by a lifting plate 12 connected to a piston rod 13 of a piston which is displaceable in a vertically disposed pneumatic lifting cylinder 14, so that when the lifting cylinder 14 is charged with compressed air the lifting plate 12 is raised in the direction of the arrow 15 to the level of a table plate 16.

A sliding carriage 18 displaceable on a horizontal guide 17 is provided behind the lifting plate 12, which sliding carriage 18 carries a stop wall 19 and four sensors 20 therebehind which are arranged side by side and spaced apart at distances corresponding to the distances between the four rows of cartons, each sensor projecting slightly into the range of the approaching cartons 1 through a slot 21 in the stop wall 19, as illustrated by the dash-dot line 20', so long as no carton is abutting against the stop wall 19.

Each sensor 20 is operatively connected to a microswitch 51, so that the latter is closed when a carton 1 abuts against the stop wall 19 and consequently urges the corresponding sensor towards the rear. The four microswitches 51 are connected in series with each other and with solenoid valves 52, 53 connected to a voltage source. When all four microswitches 51 are closed, the two solenoid valves 52, 53 are energized. Thereby compressed air is admitted to the actuator cylinder 10 and to a lifting cylinder 22. A depending flange 61 secured to the lifting plate 12 serves the purpose of deflecting the sensors 20 as long as the lifting plate 12 is in its elevated position. The sliding carriage 18 is connected, via a linkage 23 having a bell crank lever 25, pivotably mounted at 24, to a piston rod 26 of a piston displaceable in the actuator cylinder 22, so that when the actuator cylinder 22 is charged with compressed air the sliding carriage 18 carries out a slight movement in the direction of the arrow 27.

A horizontal pneumatic pusher cylinder 29 is mounted on a support 28 above the counter plate 5, and a pusher 31, displaced in the direction of the arrow 32 when the pusher cylinder is charged with compressed air, is mounted on a piston rod 30 of a piston displaceable in the pusher cylinder 29. The pusher cylinder 29 is controlled by a solenoid valve 54 located in the circuit of a microswitch 55, which microswitch is closed when a sensor 33 arranged above the lifting plate 12 is pivoted slightly upwards by the cartons 1 located on the latter. The sensor 33 is arranged at a height above the table plate 16 corresponding to the height of the cartons.

The method of operation of the batching machine already substantially indicated in the foregoing specification is hereinafter described in greater detail.

As soon as the cartons 1, conveyed in four side-by-side rows by the belts 2 and 3, have left the lower belt 2 and arrive on the brake plate 4, their movement is arrested to the extent that they advance only when they are pushed by following cartons, i.e., there are no spaces between the cartons on the free delivery end of the upper run 2' of the lower belt 2. When the foremost cartons 1 of the four rows finally arrive at the stop wall 19 they press back the sensors 20, although this does not generally occur for the four rows exactly at the same instant. As soon as all four sensors 20 are pressed back, thus energizing the previously mentioned solenoid valves 52, 53, via the microswitches 51, the actuator cylinders 10 and 22 are charged with compressed air. Consequently, the brake plate 4 is urged upwardly by the actuator cylinder 10 and the linkage 6, so that the cartons 1 located on the brake plate 4 are momentarily jammed between it and the counter plate 5. Simultaneously, the actuator cylinder 22 and the linkage 23 displace the sliding carriage 18 with the stop wall 19, and the sensors 20, slightly in the direction of the arrow 17, so that the 6×4=20 cartons grouped on the lifting plate 12 are not jammed against the stop wall 19 during the subsequent upward movement of the lifting plate 12 and so do not obstruct this movement. Over a microswitch 56 which is closed by the movement of the carriage 18, and a microswitch 58 actuated by the pusher 31 in its retracted position, a solenoid valve 57 is energized. Thereby the lifting cylinder 14 is supplied with compresed air, and the lifting plate 12 moves upwardly with the group of twenty-four cartons. The cartons actuated in their topmost position not only the sensor 33 but also a sensor 59 which is connected with a microswitch 60. Said microswitch 60 is connected in parallel with the switches 56 and 58 and has the effect that the valve 57 remains in position when the pusher 31 displaces the group of cartons from the lifting plate 12 and thereby opens the microswitch 58. If also the sensor 59 and therewith the microswitch 60 are de-activated, the lifting plate 12 will again move downwardly. A conventional packaging device will generally be mounted on the table plate 16 in order to pack the batch of cartons, and a sheet of packing paper is located in the vertical plane 34 indicated by a dash-dot line immediately in front of the table plate 16, for example, which sheet of packing paper is thrust by the batch of cartons into a folding passage which folds the sheet around the batch.

All the air cylinders are returned into their initial position immediately after the feed movement of the pusher 31, so that a further twenty-four cartons can be fed on to the lifting plate 12.

In comparison to the known batching machines, the illustrated batching machine occupies little space and is exceptionally reliable in operation, since the movements of the various air cylinders are initiated only when the preceding operational step of the machine has actually been carried out.

Preferably, the brake plate 4 is provided with a friction coating, although this is not essential if the friction of the articles to be grouped on the plate 4 is sufficiently great without this measure. It is possible to lay out the machine for only one row of cartons. Also, the distances between the conveyor belts 2 and 3, the plates 4 and 5, and the sensor 33 and the table plate 16 can be made variable, in order to adapt the machine to cartons of different height. The cartons may be guided laterally by walls or bands which, if necessary, may slightly converge towards the delivery end of the upper run 2' of the lower belt 2.

In a preferred variant of the illustrated machine, an endless auxiliary belt 35 (indicated by a dash-dot line) is provided between the upper belt 3 and the counter plate 5, and moved in the same direction and at the same speed, or substantially the same speed, as the upper belt. The drive for the auxiliary belt 35 is taken from the drive for the upper belt 3 in a manner not illustrated in detail, e.g., by means of an endless chain. There is a small space of 1 mm., for example, between the lower run 35' of the auxiliary belt 35 and the upper ends of the cartons 1, so that the auxiliary belt 35 does not participate in moving the cartons 1 but, on the other hand, prevents the cartons 1 from tilting for as long as they are located on the projecting portion of the lower belt 2 and not packed together as closely as illustrated in the drawing. The danger of tilting exists only in unfavourable circumstances, e.g., in the case of cartons of great height and small base, or in the case of articles which are only approximately rectangular and have bulging surfaces. Preferably, the auxiliary belt 35 is pivotable about the axis of rotation 36 of one of its guide rollers, so that, when its drive it not operating, it may be pivoted in the direction of the arrow 37 from its horizontal operating position into a resting position (not illustrated).

It is to be noted that the distance between the upper belt 3 and the counter-plate 5, and thus the length of the preferably provided auxiliary belt 35, is generally considerably greater than that illustrated in the drawing in relation to the other dimension, so that the cartons between the belts 2 and 3 are prevented from being squashed while the cartons located between the brake plate 4 and the counter plate 5 are clamped therebetween. When sufficient abutting cartons are located on the projecting portion of the belt 2, their frictional engagement with the belt is sufficient to push forward the cartons located in front of them, so that the last carton held between the belts 2 and 3 is still slightly spaced from the first carton resting freely on the belt 2, so that, during the actuation of the pneumatic cylinders 10 and 14, the cartons still have space to close up to each other on the projecting portion of the belt 2.

I claim:
1. In a machine for grouping substantially rectangular articles in batches, the combination comprising:
   a lower endless conveyor belt having an upper run for conveying said articles in at least one row to a delivery end of said lower conveyor belt,
   an upper endless conveyor belt above said lower conveyor belt and having a lower run opposed to said upper run of the lower conveyor belt for holding said articles thereon,
   said upper conveyor belt finishing short of said lower conveyor belt so that articles located on the delivery end thereof are free of said upper conveyor belt,
   means for driving said conveyor belts in synchronism with one another,
   a brake plate arranged beyond said delivery end of the lower conveyor belt and substantially in alignment therewith,
   brake means including said brake plate for arresting motion of articles along the latter,
   a lifting plate beyond said brake plate and having an assembly position substantially aligned therewith for assembly on said lifting plate of a batch of said articles.
   stop means beyond said lifting plate and disposed there adjacent for preventing articles from being pushed off said plate by following articles,
   means mounting said lifting plate for upward movement from said assembly position to a discharge position,
   means for energizing said brake means when said batch is assembled on said lifting plate,
   means for raising said lifting plate with said batch thereon to said discharge position, and
   means for discharging said batch from said lifting plate at said discharge position.
2. A machine according to claim 1 in which said stop means comprises a carriage, a stop wall on said carriage, means mounting said carriage for horizontal movement away from and towards said lifting plate, and an actuator for moving said carriage and which further comprises sensing means on said carriage for sensing the arrival of an article against said stop wall and means connecting said sensing means to said carriage actuator and to said lifting plate raising means respectively for arresting motion of said articles along said brake plate and for displacing said carriage away from said lifting plate so that upward motion of articles thereon is not obstructed.

3. A machine according to claim 1 which further comprises a sensor, arranged above said lifting plate for sensing the arrival of a raised batch of articles on said lifting plate at said discharge position thereof and means connecting said sensor to said batch discharging means for initiating operation thereof.

4. A machine according to claim 1 wherein said batch discharging means comprises a pusher plate and an actuator therefor and in which each of said actuators and said lifting plate raising means comprises a pneumatic piston and cylinder mechanism.

5. A machine according to claim 1 in which said brake plate has a friction coating thereon.

6. A machine according to claim 1, which further comprises an endless auxiliary belt arranged above the discharge end of said lower conveyor belt and between said upper conveyor belt and said brake means and means for driving said auxiliary belt in the same direction and at substantially the same speed, as said upper conveyor belt, said auxiliary belt having a lower run higher than the lower run of said upper conveyor belt in order to prevent articles located on the discharge end of the lower conveyor belt from tilting, without obstructing them from closing up to each other.

7. A machine according to claim 6 which further comprises means pivoting said endless auxiliary belt about an axis adjacent one end thereof for movement into an inoperative resting position.

References Cited

UNITED STATES PATENTS 3,217,859   11/1965   Bartlo _____ 198—34

RICHARD E. AEGERTER, *Primary Examiner.*